(12) United States Patent
Schantz

(10) Patent No.: US 8,484,824 B2
(45) Date of Patent: Jul. 16, 2013

(54) METHOD OF FORMING A WEARABLE SURFACE OF A BODY

(75) Inventor: Dwayne R. Schantz, Coopersburg, PA (US)

(73) Assignee: FLSmidth A/S (DK)

( * ) Notice: Subject to any disclaimer, the term of this patent is extended or adjusted under 35 U.S.C. 154(b) by 304 days.

(21) Appl. No.: 12/873,596

(22) Filed: Sep. 1, 2010

(65) Prior Publication Data

US 2012/0048980 A1 Mar. 1, 2012

(51) Int. Cl.
*B21D 39/00* (2006.01)

(52) U.S. Cl.
USPC .................... 29/505; 29/521; 29/525

(58) Field of Classification Search
USPC ........... 29/505, 510, 515, 521, 525; 228/107; 241/198.1, 277, 283, 293, 294, 295, 297, 241/298
See application file for complete search history.

(56) References Cited

U.S. PATENT DOCUMENTS

| | | |
|---|---|---|
| 252,755 A | 1/1882 | Gates |
| 278,272 A | 5/1883 | Rickerson |
| 412,558 A | 10/1889 | Stephens |
| 1,225,061 A | 5/1917 | Schultz |
| 1,589,302 A | 6/1926 | Middelboe |
| 3,137,937 A | 6/1964 | Cowan et al. |
| 3,233,312 A | 2/1966 | Cowan et al. |
| 3,474,520 A | 10/1969 | Yu Takizawa et al. |
| 3,813,758 A | 6/1974 | Araki |
| 3,868,761 A | 3/1975 | Apalikov et al. |
| 3,900,147 A | 8/1975 | Apalikov et al. |
| 3,955,766 A | 5/1976 | Chang |
| 3,964,717 A | 6/1976 | Hansen |
| 4,133,371 A | 1/1979 | Birch et al. |
| 4,357,287 A | 11/1982 | Schonert |
| 4,369,926 A | 1/1983 | Rasmussen et al. |
| 4,485,974 A | 12/1984 | Lass |
| 4,582,260 A | 4/1986 | Folsberg |
| 4,703,897 A | 11/1987 | Beisner et al. |
| 4,844,321 A | 7/1989 | Matsuzawa et al. |
| 4,848,683 A | 7/1989 | Kawatsu |
| 5,203,513 A | 4/1993 | Keller et al. |
| 5,242,098 A | 9/1993 | Hardwick |
| 5,269,477 A | 12/1993 | Buchholtz et al. |
| 5,318,213 A | 6/1994 | Strickland et al. |
| 5,400,945 A | 3/1995 | Bergmann et al. |
| 5,470,012 A | 11/1995 | Linse et al. |
| 5,531,396 A | 7/1996 | Kinnunen et al. |

(Continued)

OTHER PUBLICATIONS

U.S. Appl. No. 12/766,110.

*Primary Examiner* — Jermie Cozart

(74) *Attorney, Agent, or Firm* — Aaron M. Pile; Daniel DeJoseph

(57) ABSTRACT

A method of forming a wearable surface of a body sized and configured to comminute material includes positioning at least one first insert in a first portion of a first metal structure at a first depth, positioning at least one second insert in a second portion of the first metal structure at a second depth and positioning at least one third insert in a third portion of the first metal structure at a third depth. At least one of these depths is different than the other depths. A second metal structure may be positioned adjacent to the first metal structure and at least one explosive material may be detonated to attach the inserts to the first metal structure. Material may then be removed to shape and form a wearable surface of a crushing body, which may be, for example, a crushing member or a segment of a crushing member.

19 Claims, 13 Drawing Sheets

U.S. PATENT DOCUMENTS

| | | |
|---|---|---|
| 5,755,033 A | 5/1998 | Gunter et al. |
| 5,823,450 A | 10/1998 | Folsberg |
| 6,523,767 B1 | 2/2003 | Ramesohl |
| 7,300,708 B2 | 11/2007 | Gigliotti, Jr. et al. |
| 7,517,580 B2 | 4/2009 | Mulligan et al. |
| 2008/0286598 A1 | 11/2008 | McCracken et al. |
| 2009/0218429 A1 | 9/2009 | Hagedorn et al. |

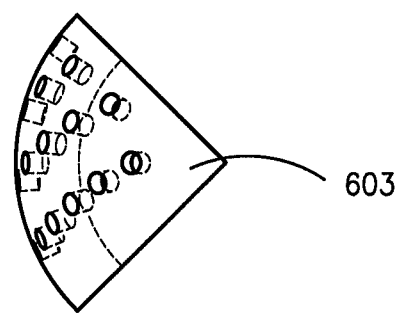
Fig. 12a
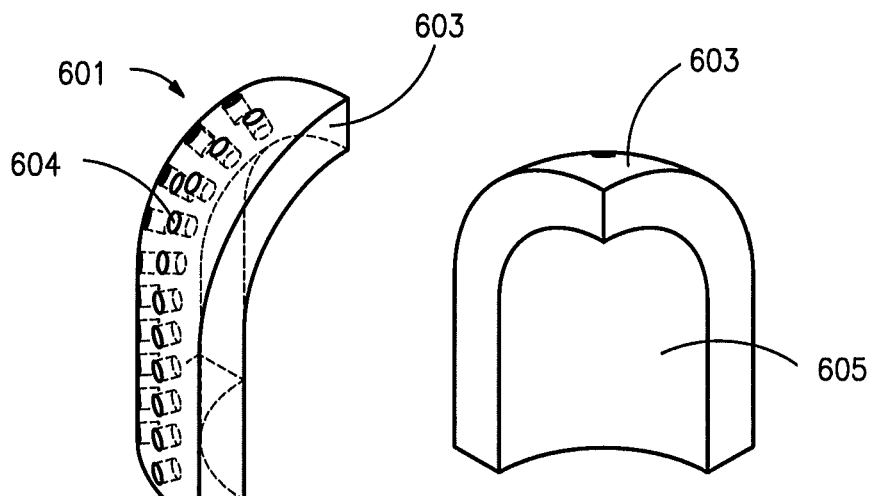
Fig. 12
Fig. 12b

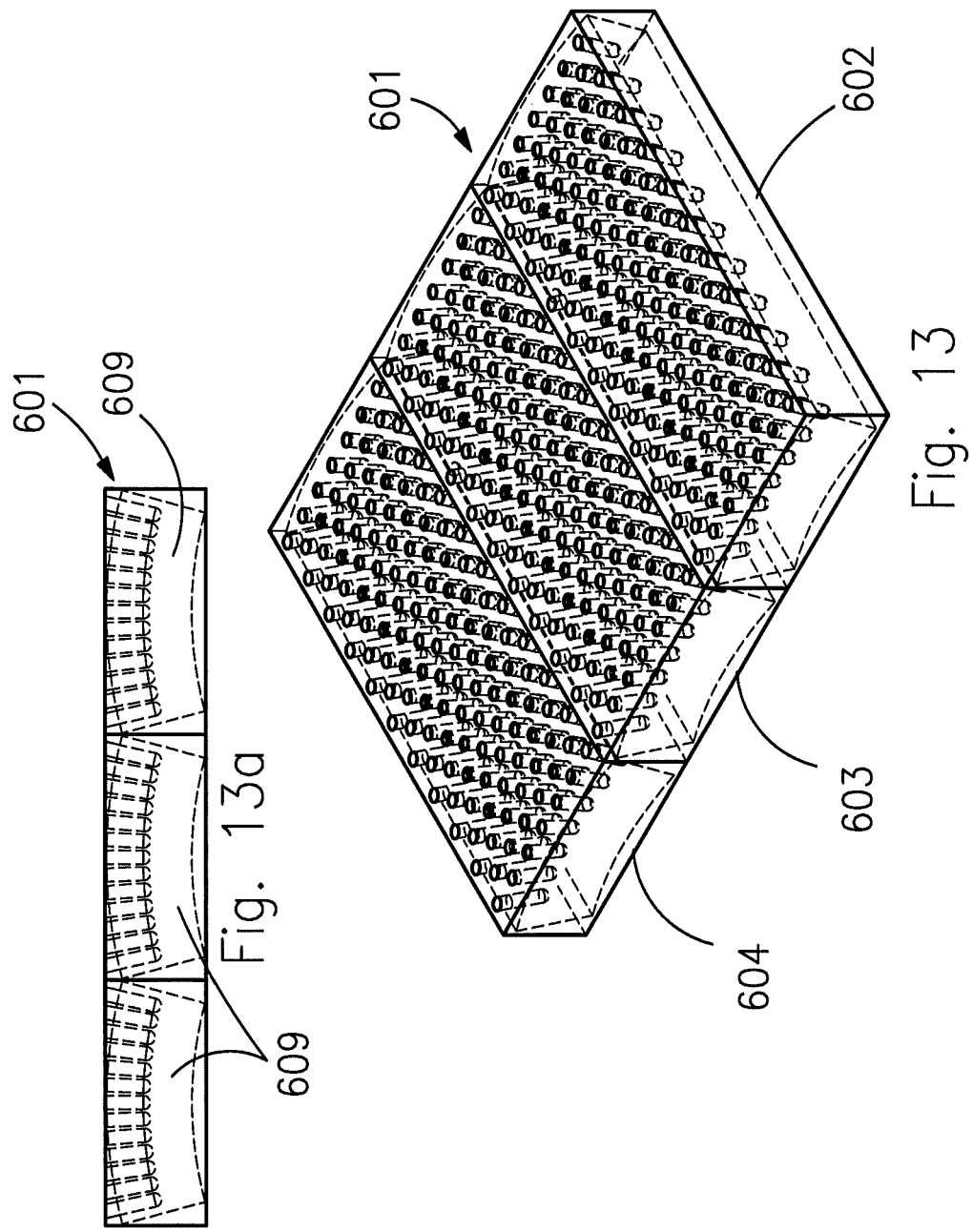

METHOD OF FORMING A WEARABLE SURFACE OF A BODY

FIELD OF THE INVENTION

The present invention relates to wearable surfaces for the commination of material. Such wearable surfaces may be provided on rollers of roller mills for grinding material or crushing surfaces of crushing devices, such as crushers, grinders, presses, roller presses, jaw crushers, gyratory crushers, vertical grinding mills, other mills or other devices configured to crush material or comminute material. Preferably, the wearable surface is configured to form an autogenous layer or semi-autogenous layer for a crushing body of a commination device such as a die or roller of a mill.

BACKGROUND OF THE INVENTION

Mills, presses, crushers, and other crushing devices used to comminute material often include a crushing body or multiple crushing bodies that are configured to impact material to crush or grind the material. Often the crushing bodies are configured to grind the material between a surface of the crushing body and a table, wall, or other surface. Examples of such crushing devices may be appreciated from U.S. Pat. Nos. 252,755, 278,272, 412,558, 1,225,061, 1,589,302, 3,955,766, 3,964,717, 4,369,926, 4,485,974, 4,582,260, 4,848,683, 5,203,513, 5,823,450, and 6,523,767 and U.S. Patent Application Publication No. 2009/0218429. As another example, roller presses may have one or more rollers configured to impact material to grind the material. Each roller may include a wear surface. The wear surface may be attached to the roller. For instance, the wear surface of the roller may be welded to the roller.

A wearable surface typically experiences wear as material is crushed by the wear surface. After a period of time, the wear surface may experience a sufficient amount of wear such that it is unable to crush material or experiences a great reduction in crushing ability. For example, portions of the wear surface may erode or become broken during use and subsequently requires replacement or repair.

Some wearable surfaces used in crushing devices include hexagonal tiles, such as the tiles disclosed in U.S. Pat. No. 5,755,033. A tiled surface can include tiles that have gaps between the tiles. The tiles are affixed to a base material and are harder than the base material. Such tiles are often costly to process due to the size of the equipment necessary to make such products. Further, such tiled wearable surfaces are usually not capable of being repaired while the wearable surface is positioned in a plant or processing line for grinding material. The inability to conduct in-situ repairs on such products can be a major hindrance for a manufacturer and can greatly increase the cost of maintaining or repairing such devices.

Other wearable surfaces used in crushing devices may be appreciated from U.S. Pat. No. 5,269,477. Such wearable surfaces include insert members embedded in a surface of a cylindrical press roll. A binding ring may be used to attach the inserts to the press roll. The insert members may project radially into the surface of the roll. The insert members are configured to crush material. Rollers with such a wear surface may require a relatively intensive amount of labor to embed the insert members into the surface of a roller. The lead times for manufacturing such products is also relatively high. Further, serial production is difficult for such rollers. These types of rollers may also have a relatively limited capacity for in-situ repair, such as repair while the rollers are on equipment in a production line of a manufacturing facility.

Previously filed U.S. patent application Ser. No. 12/766,110 discloses crushing devices that utilize crushing bodies that have wearable surfaces formed from explosion forging processes and explosion welding processes. The owner of the rights in the present application also owns the rights to U.S. patent application Ser. No. 12/766,110. The entirety of U.S. patent application Ser. No. 12/766,110 is incorporated by reference herein. The crushing bodies disclosed in U.S. patent application Ser. No. 12/766,110 may be sized and configured for use in a wide array of commination devices such as crushing devices or grinding devices. Among other things, that application discloses a method of making crushing bodies by explosively forging hard inserts within at least one metal structure to form a crushing body. However, to subsequently shape such a crushing body to a desired shape may require extensive cutting or shaping due to the cutting of the hard inserts positioned within the crushing body. Such subsequent shaping may add significant time and cost to the manufacture of such crushing bodies or crushing devices utilizing such crushing bodies.

A new wearable surface is needed that may be defined on a crushing body so that the crushing body may be formed and shaped quickly and at a lower cost than crushing bodies of the prior art. Preferably, such a wearable surface is able to permit relatively short lead times for manufacturing and may permit in-situ repairs to take place while the equipment is in a product line of a manufacturing facility, crushing circuit, or material processing facility.

SUMMARY OF THE INVENTION

A method for forming a wearable surface of a body sized and configured to comminute material may include the steps of providing a first metal structure, positioning at least one first insert in a first portion of the first metal structure at a first depth, positioning at least one second insert in a second portion of the first metal structure at a second depth and positioning at least one third insert in a third portion of the first metal structure at a third depth. The third depth is different than at least one of the first depth and the second depth or the first depth is different than at least one of the second depth and the third depth. A second metal structure may be positioned adjacent to the first metal structure so that a gap is formed between the first metal structure and the second metal structure. One or more explosive materials may then be positioned adjacent to the second side of the second metal structure and the one or more explosive materials may be ignited to attach the at least one first insert, the at least one second insert and the at least one third insert to the first metal structure. Material may then be removed from at least one of the first portion of the first metal structure, the second portion of the first metal structure, the third portion of the first metal structure and the second metal structure to shape the first metal structure and form a wearable surface of a crushing body.

It should be appreciated that the first depth may be equal to the second depth, may be less than the second depth or may be greater than the second depth for different embodiments of the method. The third depth may be equal to the second depth, less than the second depth, greater than the second depth, less than the first depth, equal to the first depth or greater than the first depth for different embodiments of the method.

In some embodiments, the one or more explosive materials may be positioned adjacent to the second side of the first metal structure by being placed on the second side of the second metal structure or by being attached to the second side of the second metal structure. Spacers may also be positioned between the first and second metal structures to position the second metal structure adjacent to the first metal structure to form the gap.

In one embodiment of the method, the removing of material may be performed to form the wearable surface so that the wearable surface has a circular shape, a toroidal shape, a curved shape, a contoured shape, a conical shape, a frusto-conical shape, a conical-like shape, a domed shape, a wedged shape, a wave shape, a wave-like shape, a concave shape or a convex shape. The removing of material may be performed by using at least one of machining, grinding, saw cutting, wear, electric discharge machining, and water jet cutting mechanisms.

In some embodiments of the method, the crushing body may be sized and configured to be a liner, a sleeve, or a segment of a crushing member. In other embodiments of the method, the crushing body may be a segment of a crushing member and the crushing member may be a roller of a mill, a die of a crushing device, a table of a crushing device, an anvil of a crushing device or a wall of a crushing device. Embodiments of the method may also include attaching such a segment of a crushing member to at least one other segment of a crushing member to form the crushing member.

Preferably, the at least one first insert, at least one second insert and at least one third insert are positioned in the first metal structure and attached to the first metal structure so that the removal of material to shape or form the wearable surface does not involve any cutting, grinding or machining of any of these inserts.

In some embodiments, the second metal structure may directly impact the first metal structure so that the second metal structure has an intramolecular bond or a metallurgical bond with the first metal structure. Such impacting may occur after the one or more explosive materials are ignited. The one or more first, second and third inserts may also be attached to the first metal structure such that there is no metallurgical bond between the first, second and third inserts and the first metal structure.

The at least one first, second, and third inserts may all be harder than the first metal structure. The one or more explosive materials may be ignited to cause deformation of first, second and third portions of the first metal structure to attach the first, second, and third inserts to the first metal structure. In some embodiments, the at least one first insert may be less hard than at least one of the one or more second inserts and the one or more third inserts. In other embodiments, the at least one third insert may be harder than the at least one second insert and the at least one first insert. The one or more second inserts may also be harder than the one or more first inserts.

Embodiments of the method may also include the step of moving the second metal structure away from the first metal structure and providing stress relief to the crushing body.

In some embodiments, the positioning of the one or more first inserts, second inserts and third inserts may be performed by drilling one or more recesses into respective portions of the first metal structure and positioning those inserts into respective recesses.

A device configured to comminute material is also provided. The device includes a moveable crushing body, a first surface adjacent to the moveable crushing body that is sized and configured to support or retain material to be impacted by the crushing body, and a wearable surface attached to the crushing body. The wearable surface is positioned on the crushing body such that the wearable surface impacts the material to crush the material. At least one of the first surface and the wearable surface of the crushing body is formed by an embodiment of the method discussed above.

In some embodiments of the device, the first surface may be the surface of a table, an anvil or a wall and the crushing body may be a die, a crusher head, or a roller. The device may be a mill, a crusher, a cone crusher, a press, a roller press, or a roller mill. The device may be configured to comminute agglomerated material, rock, stone, minerals, or ore.

It should be appreciated that the at least one first insert, the at least one second insert and the at least one third insert may each be comprised of at least one of conical insert members, tapered insert members, spherical insert members, and cylindrical insert members. In some embodiments of the device, the inserts may be covered by a portion of the first metal structure after the at least one explosive material is ignited. It should be understood that the inserts may subsequently be exposed during commination operations as portions of the first metal structure is eroded to define a semi-autogenous layer on the wearable surface.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred embodiments of the wearable surface, devices configured for the commination of material that utilizes an embodiment of the wearable surface and methods of making the same are shown in the accompanying drawings.

FIG. 6a is a front view of the present preferred metal structure shown in FIG. 6.

FIG. 9a is an elevated front view of the second present preferred segment of a crushing member that includes a wearable surface.

FIG. 12 is a side perspective view of a present preferred metal segment that is sized and shaped to be a portion of a crusher head. It should be appreciated that a plurality of such segments may be interconnected to form a crusher head. Inserts positioned in the metal structure are shown in broken line.

FIG. 12a is a top view of the present preferred metal segment that is sized and shaped to be a portion of a crusher head shown in FIG. 12. Inserts positioned in the metal structure are shown in broken line.

FIG. 12b is a front perspective view of the present preferred metal segment that is sized and shaped to be a portion of a crusher head shown in FIG. 12.

FIG. 13 is a perspective view of a present preferred metal structure 601 that has inserts attached therein. The metal structure may be cut into a plurality of pieces 602, 603, and 604. The pieces may be cut into segments 609 as may be appreciated from the shaped segments shown in dotted line in FIG. 13.

FIG. 13a is a front view of a present preferred metal structure 601 that has inserts attached therein. The metal structure may be cut into a plurality of pieces 602, 603, and 604. The pieces may be cut into segments 609 as may be appreciated from the shaped segments shown in dotted line in FIG. 13a.

DETAILED DESCRIPTION OF PRESENT PREFERRED EMBODIMENTS

Figure 1:
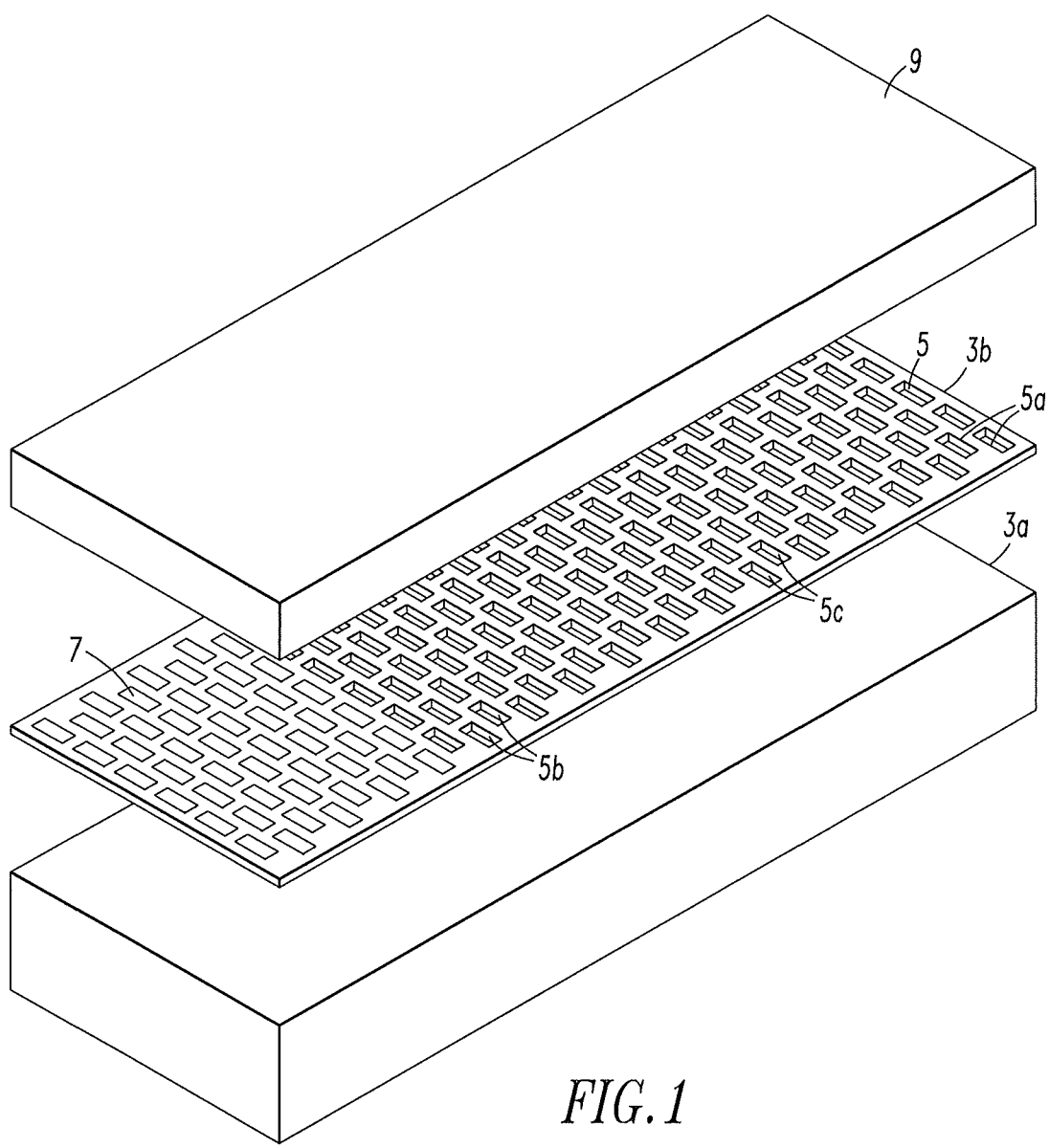
FIG. 1 is an exploded view illustrating a first present preferred embodiment a wearable surface for a crushing device adjacent to a second metal structure.

Referring to FIG. 1, a wearable surface may be formed on a crushing body of a commination device such as a roller mill, vertical roller mill, crusher, a crusher device or a grinding device. For example, a crushing body may include a base portion 3a and an outer portion 3b. The outer portion 3b may include recesses 5 that are sized and configured to receive inserts, such as insert members 7. The recesses 5 may be formed by drilling holes into the outer portion of the crushing body or by forming the crushing body such that it has recesses 5 formed therein. For instance, an end mill may be used to form such recesses 5. The recesses that are formed may have different shapes or alignments and be configured to be any of a number of apertures, such as bores, holes, channels, or other apertures. The outer portion 3b may be integral with the base portion 3a or are portions of the same metal body or structure, such as a metal cylindrical structure.

The insert members 7 may be sized and configured such that each insert member is wider than it is long or may be configured to be a square-like shape or may be configured to have different shapes and sizes. The insert members are preferably composed of tungsten carbide that have a cylindrical shape, conical shape or tapered shape. The insert members may include insert members of different shapes or sizes or all the insert members may be the same shape and size. The insert members may be composed of other hard materials, such as, for example, industrial made diamonds, diamonds, hard ceramic material, hard composite material, or other hard materials that are harder than the material of outer portion 3b.

The insert members 7 are preferably harder than the outer portion 3b and base portion 3a. For example, the insert members preferably have a harder Brinell value, Rockwell value, Vickers value, Knoop value or Leeb Rebound value than the hardness rating of the crushing body, or the outer portion 3b of the crushing body. As another example, the insert members preferably have a harder durometer value than the crushing body or outer portion 3b of the crushing body.

Each insert member 7 may be positioned in a recess 5 formed in the outer portion 3b. Mortar such as high temperature mortar, cement, a binder, or an adhesive may be used to position the insert members 7 within the recesses 5 and bond the insert members to the crushing body. It should be appreciated that any adhesive that is commercially available, relatively low in cost, and relatively reliable may preferably be used. The insert members may be positioned so that the entire insert is within a recess or may be positioned so that only a portion of the insert member is within the recess. Preferably, the insert members are positioned in the recesses such that the outermost portions of the insert members are recessed relative to the outermost portion of the outer portion 3b.

The recesses 5 formed in the outer portion 3b may include a first set of recesses 5a, a second set of recesses 5b and a third set of recesses 5c. The first set of recesses 5a may be formed or drilled into a first portion of the outer portion 3b. The second set of recesses 5b may be formed or drilled into a second portion of the outer portion 3b. The third set of recesses 5c may be formed or drilled into a third portion of the outer portion of 3b. The third portion of the outer portion 3b and the third set of recesses 5c may be located between the first and second set of recesses 5a and 5b and the first and second portions of the outer portion 3b.

The depths of each recess of the first set of recesses 5a may have a first depth value. The depths of each recess of the second set of recesses 5b may have a second depth value. The depths of each recess of the third set of recesses 5c may have a third depth value. The first depth value, second depth value and third depth value may all be the same value, such as up to 4.0 inches within the outer portion 3b or a depth that is greater than 4.0 inches within the outer portion 3b.

Alternatively, each depth value may be different or one of the depth values may be different. For example, the second depth values for the depth of each recess of the second recesses 5b may be 5.0 inches and the third depth value for the depths of the recesses of the third set of recesses 5c may be 6.0 inches. The first depth value for the first set of recesses 5a may be the same as the depth value of the second set of recesses, such as 5.0 inches, may be the same depth value as the depths of the third set of recesses, such as 6.0 inches, or may be some other depth value, such as 3.0 inches, 4.0 inches or 7.0 inches.

The different set of recesses 5a, 5b, and 5c may have the same orientations or alignments or may be aligned or oriented differently than other sets of recesses. For instance, the first set of recesses 5a may be aligned so that the depths extend in a direction that is generally perpendicular with the outermost surface portion of the outer portion 3b of the crushing body. The second set of recesses 5b may be aligned so that the depths of the recesses generally extends within the outer portion 3b in a direction that is at a 45 degree angle relative to the outermost portion of outer portion 3b. The third set of recesses 5c may have depths that extend in a generally perpendicular direction similar to the first set of recesses 5a or may have depths that generally extend in a direction similar to the second set of recesses 5b. As another alternative, the third set of recesses 5c may have depths that extend within the outermost portion 3b in a different alignment or orientation, such as depths that extend or generally extend in a direction that is at a 60 degree angle relative to the outermost portion of outer portion 3b or depths that extend in a direction that is at a 30 degree angle relative to the outermost portion of outer portion 3b.

A first set of inserts may be positioned within the first set of recesses 5a, a second set of inserts may then be positioned in the second set of recesses 5b and a third set of inserts may be positioned in the third set of recesses 5c. Preferably, the inserts are positioned so that a portion of each insert is at the depth of the recess in which it is positioned.

The inserts in each set of recesses may be different inserts or may all be the same. As another alternative, the inserts in the first set of recesses may be one type of insert and the inserts in the second and third set of recesses may be a second type of insert that is harder than the first type of insert. As yet another alternative, the inserts in the first set of recesses and the second set of recesses may be one type of insert and the inserts in the third set of recesses may be a second type of insert that is harder than the first type of insert.

A second metal structure 9 may be positioned over the insert members 7 and crushing body or adjacent to the insert members 7 and crushing body. For example, the second metal structure 9 may be positioned such that there is a gap between the crushing body and the second metal structure 9. The second metal structure 9 may be a flyer plate, a flyer tube, a driver plate, a driver tube, a driver pipe, or other metal structure. The insert members 7 are preferably harder than the second metal structure 9.

The outer portion 3b and the second metal structure 9 may be ground prior to the positioning of these structures or prior to ignition of any explosives. The grinding may be used to remove scale or other surface defects from the surfaces of the metal structures.

Preferably, the second metal structure 9 is positioned adjacent to the insert members 7 and the crushing body such that there is a gap formed between the second metal structure and the embedded inserts and outer portion 3b of the crushing body. The gap may be maintained by positioning spacers between the outer portion 3b and the second metal structure. The spacers may define the size of the gap. The width of the gap may define a standoff size. In alternative embodiments, it is contemplated that the gap does not exist or may be so small that the standoff distance, or standoff size, is almost 0 or is 0.

One or more explosive materials may be positioned adjacent to the second metal structure. For instance, the second metal structure 9 may have a first side that faces toward the gap and the outer portion 3b of the crushing body and a second side opposite the first side. The one or more explosive materials may be positioned adjacent to the second side of the second metal structure 9. For instance, the one or more explosive materials may be positioned on the second side of the second metal structure 9 or near the second side of the second metal structure 9.

The one or more explosive materials may include one or more explosives obtained from suppliers or vendors of such materials. It is contemplated that the one or more explosives may include explosive material that includes any number of suitable explosive materials or combination of explosive materials. For example, it is contemplated that explosive material that may be used could include ammonium nitrate, amatol, guanidine, dynamite, cyclonite, plastic explosives, explosive powder, ammonium nitrate/fuel oil (ANFO), EL819 type explosive material, T200 type explosive material or other explosive materials.

In some embodiments of the method, a cover plate or other structure may be positioned over a top of the second metal structure 9 and the crushing body. A portion of the one or more explosives or a different explosive may be positioned on the cover plate and be in contact with the one or more explosives positioned near the second metal structure as well.

Alternatively, the second metal structure and the crushing body may be arranged such that the second metal structure covers the top of the first metal structure so that no cover plate is needed or is otherwise used.

The explosives may be ignited to force the second metal structure 9 into contact with the outer portion 3b of the crushing body to deform the outer portion 3b of the crushing body to attach the inserts to the crushing body to form a wearable surface. The second metal structure 9 may be moved away from the crushing body that has the formed wearable surface after the deformation of the outer portion 3b is completed. For example, the second metal structure may be cut and then hit or impacted by a tool or machine to separate or remove the second metal structure 9 from the inserts and the crushing body. Alternatively the crushing body may be moved away from the second metal structure 9 or both structures may be moved away from each other.

Preferably, the insert members are covered or encapsulated by a portion of the crushing body after the ignition of the explosive material due to a deformation of the crushing body caused by the force from the ignited one or more explosives that is transferred via the second metal structure 9.

Figure 1A:
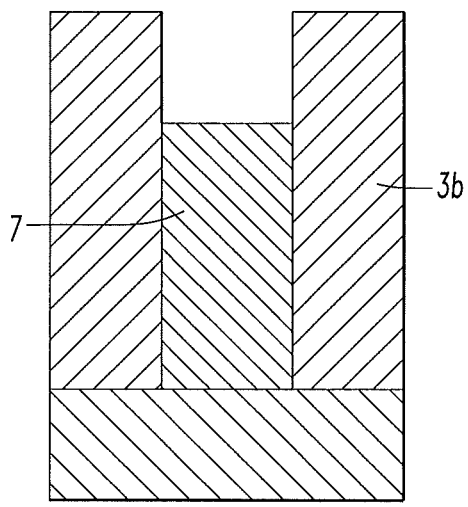
FIG. 1A is a fragmentary cross sectional view illustrating an insert positioned within a recess of the outer portion of a crushing body prior to the ignition of any explosive material.
Figure 1B:
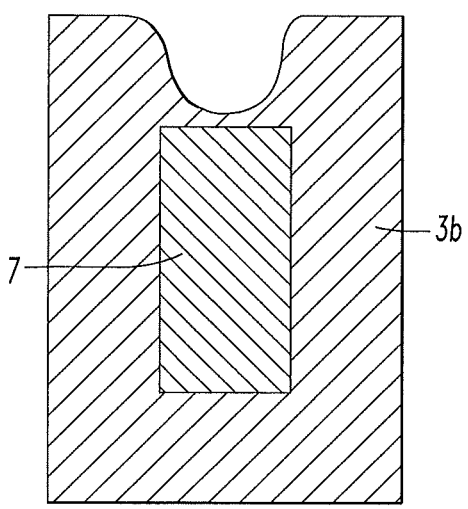
FIG. 1B is a fragmentary cross sectional view illustrating an insert positioned within a recess of the outer portion of a crushing body after explosive material was ignited and the second metal structure transferred force from the ignited explosives to the outer portion of the crushing body to deform a portion of the outer portion of the crushing body.

The deformation of the outer portion 3b may also cause the outer portion 3b to engage the insert members 7 or cause a mechanical interlock between the outer portion 3b and the insert members 7 to attach the inserts to the outer portion 3b. Example of such deformation that occurs to attach the insert members 7 to the outer portion 3b of the crushing body may be appreciated from FIGS. 1A and 1B. The deformation caused by the ignition of the explosive material that provides an attachment of the inserts to the outer portion 3b of the crushing body may be considered an explosive forging ("EXF") of the inserts to the outer portion 3b of the crushing body.

It should be appreciated that the ignited explosives may not cause explosion welding or other welding to occur between the insert members 7 and the outer portion 3b of the crushing body. No metallurgical bonding between the insert members 7 and the outer portion 3b may take place.

If the crushing body is a cylinder or other structure that includes a central channel therein, that channel may be filled by a central plug prior to the ignition of explosives. The placement of the plug may support the structure and prevent the structure from becoming damaged or deforming in an undesirable way as a result of any force that may be transferred from ignited explosives. After the explosive material is ignited and the inserts are attached to the metal structure as desired, the central plug may be removed as well.

After the crushing body has had the inserts attached to the outer portion 3b of the crushing body, the crushing body may undergo cutting, bending, flattening or other machining to form a desired shape for use as a wearable surface or a portion of such a wearable surface. The wearable surface may also undergo stress relief treatment, such as a heat treatment, testing, or other steps necessary for acceptably manufacturing the formed structure.

The wearable surface that is formed may be configured so that the wearable surface experiences wear during crushing operations to form a semi-autogenous layer or semi-autogenous surface of the crushing body. For instance, the outer portion of the wearable surface that covers the inserts may experience wear and be eroded off of the inserts over time to form a semi-autogenous layer. As one example, portions of the wearable surface covering the inserts may experience wear and erode off of the wearable surface, exposing a portion of the inserts, which are harder than the material covering them. The exposed portions of the inserts may be positioned proud relative to adjacent portions of the metal structure to which they are attached. The exposed portions of the recessed inserts that are subsequently exposed after commination operations or crushing operations have begun may then form or help define a semi-autogenous layer of the wearable surface.

It should be appreciated that the different set of recesses 5a, 5b and 5c may include inserts positioned at different depths so that different inserts are positioned at different depths within the outer portion 3b. As a result, the wearable surface may be formed so that the wearable surface is configured to experience wear to form a wearable surface having a desired contour or shape. For instance, if inserts positioned within the third set of recess 5c are positioned at a depth that is less deep than the inserts in the first and second set of recess 5a and 5b, the wearable surface may have a wave-like shape or parabolic like shape or contour after experiencing sufficient wear. As another example, if inserts positioned within the first set of inserts 5a are positioned at a depth that is less deep than the inserts positioned in the third set of recesses 5c and the inserts positioned in the third set of recesses 5c are positioned so that they are less deep than the inserts positioned in the second set of recesses 5b, the wearable surface may be configured to have a tapered shape or wedge shape after experiencing sufficient wear.

As another alternative, after a wearable surface is formed on a crushing body, the crushing body may be cut to a desired shape or size to remove material from the crushing body to shape the wearable surface of the crushing body. For example, electric discharge machining, water jet cutting mechanisms, saws, or other cutting mechanisms may be used to cut a crushing body or a wearable surface for shaping the crushing body or shaping the wearable surface of the crushing body. Preferably, the depths for each set of inserts within recesses 5a, 5b and 5c are sufficient so that any cutting of the crushing body does not require the hard inserts to also be cut. Instead, such cutting may only cut the softer material of the outer portion 3b of the crushing body. After the wearable surface is shaped on the formed crushing body, the crushing body may be mounted or otherwise attached to a crushing device. For instance, the crushing body may be attached to an actuation mechanism or movement mechanism of the crushing device that is configured to move the crushing body to crush material fed to the crushing device.

The cut surface or crushing body may also be bent, flattened, or otherwise machined to provide a desired shape, size or structural configuration for assembly required to form a desired crushing device or crushing mechanism of a crushing device. The formed structures may then undergo stress relief, such as a heat treatment. It should be appreciated that different structures that are formed from such cutting and other processing may then be attached together to form a crushing body, a wearable surface for a crushing body, or a wearable surface for a support used to support material being impacted by a crushing body such as, for example, an anvil, a table, or other support.

The crushing body is preferably a crushing member such as a roller of a roller mill, vertical mill or roller press. Of course, the crushing body may be a crushing member that is sized and configured to be a component of other crushing devices such as grinding devices, milling devices, crushers, pulverizers, sizers, or commination devices as well. For example, the crushing body may be a metal plate or a metal cylindrical structure and the second metal structure 9 may be a metal plate or a metal cylindrical structure. Each metal cylindrical structure may be, for example, a metal tube, a metal disc, a metal cylinder, or a metal pipe. The metal of the base portion 3a, outer portion 3b and the metal of the second metal structure 9 may be grade 4140 steel. It should be understood that other steels, alloys or other metals may also be used for the crushing body and the second metal structure to meet a particular design objective. It is also contemplated that the outer portion 3b, base portion 3a and second metal structure 9 may also be composed of different metals in some alternative embodiments.

The inserts may include insert members 7 that are polygonal shaped, conical shaped, circular shaped, cylindrical shaped, rectangular shaped, elliptical shaped, or of other shapes or structures to meet a desired design objective. For example, the inserts may be thirty millimeter inserts, forty millimeter inserts, be of other sizes or include a combination of sized and shaped insert members to meet a desired design objective.

Figure 2:
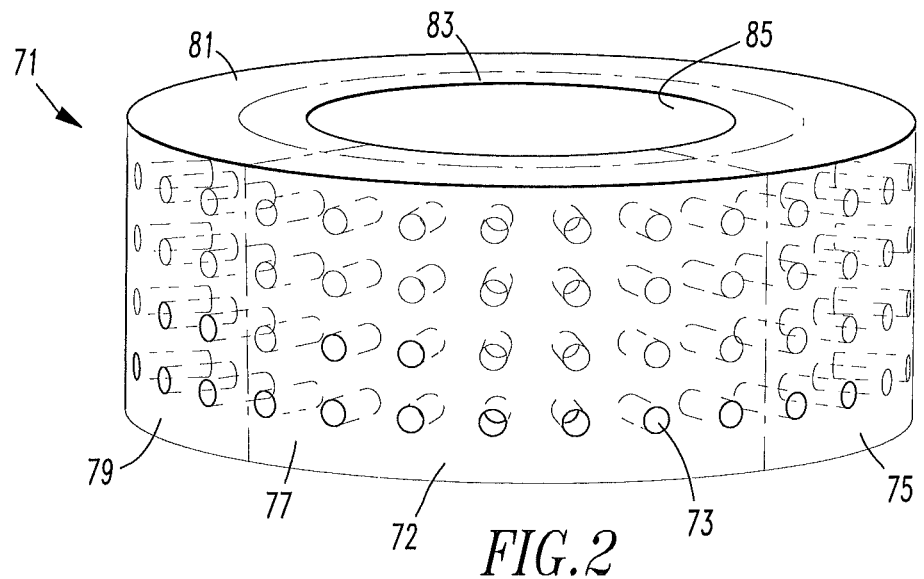
FIG. 2 is a perspective view of a first present preferred crushing body that may be used in a first present preferred embodiment of a crushing device.

Referring to FIG. 2, a first present preferred crushing body 71 includes a wearable surface 72 that has a plurality of portions 75, 77 and 79. The crushing body 71 also includes a central channel 85. An inner portion 83 of the crushing body may be adjacent to the central channel 85. The inner portion 83 is integral to a wearable surface portion 81, or outer portion, of the crushing body 71.

The crushing body 71 is preferably a generally cylindrical structure such as a tubular structure or sleeve structure. The first portion 75 may extend from 0 degrees to 120 degrees around the outer circumference of the crushing body 71, the second portion 75 may extend from 120 degrees to 240 degrees around the outer circumference of the crushing body 71 and the third portion 79 may extend from 240 degrees to 360 degrees around the outer circumference of the crushing body 71. Each portion may be separately formed and connected together. For such an embodiment, each portion may have had inserts embedded therein and subsequently attached via deformation caused by igniting explosives utilizing an embodiment of a method discussed above.

Alternatively each portion may be a portion of an integral structure that had inserts embedded therein that was subsequently attached via deformation caused by igniting explosives utilizing an embodiment of a method discussed above. The inserts 73 positioned in each portion may be positioned at a different depth within the different portions 75, 77 and 79. The different depths for the inserts may be selected to provide the wearable surface portion with a desired shape after experiencing a sufficient amount of wear to remove material from the outer portion of the wearable surface to expose an outer portion of the inserts.

As an alternative, the depths of the inserts may be selected to ensure that removal of material from the crushing body 71 may be performed by equipment or tools to shape the wearable surface portion of the crushing body without requiring any of the inserts to be cut, ground or machined. If the inserts are all harder than the metal structure, such positioning of the inserts is able to allow the removal of material from the crushing body 71 to be performed much more quickly. Since the inserts are not being cut or machined, equipment that may be utilized to remove such material may also experience less wear, which helps improve the life of that equipment and costs associated with maintaining that equipment.

Figure 3:
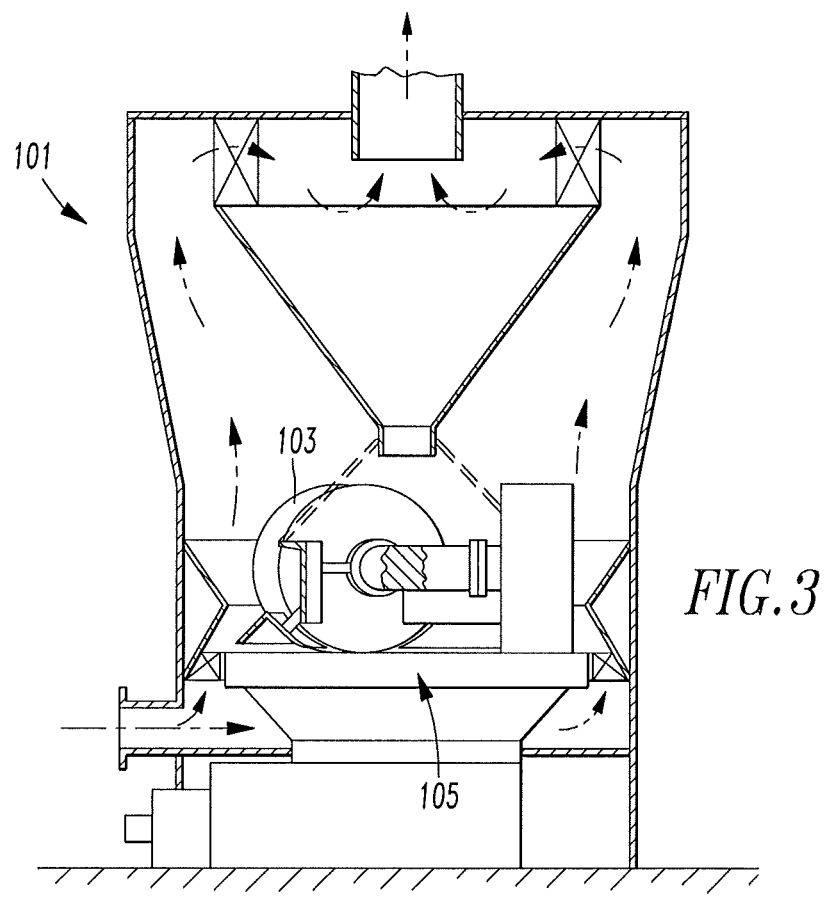
FIG. 3 is a diagrammatical elevation view of a first present preferred embodiment of a crushing device.
Figure 14:
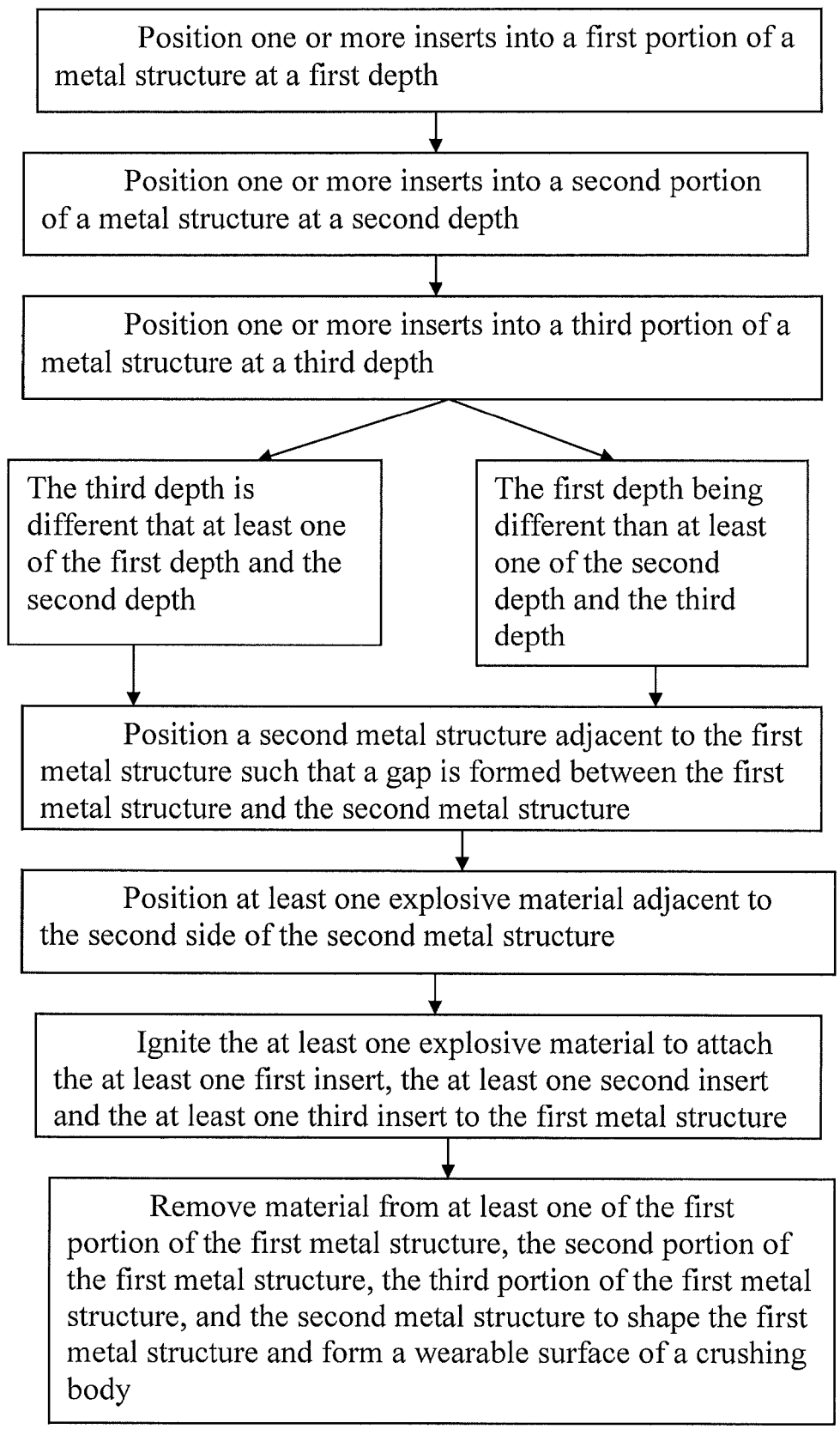
FIG. 14 is a flow chart illustrating a present preferred method of making a body that includes a wearable surface for the commination of material.

Referring to FIG. 3, a roller mill 101 may include a roller 103 that has a wearable surface formed by using any of the methods discussed above or may be structured as described above. The roller mill 101 may also have been created utilizing the method shown in FIG. 14 or a method disclosed in U.S. patent application Ser. No. 12/766,110 (the entirety of which is incorporated herein by reference).

The wearable surface of the roller 103 may be formed by attaching inserts to a first metal structure together via the ignition of explosives to cause a transfer of force sufficient to deform the first metal structure to engage a portion of the surface area of the inserts for attaching the inserts to the metal structure. The roller 103 may include, for example, the crushing body 71 shown in FIG. 2 and described above. The roller 103 may be configured to move adjacent to a surface 105. The surface 105 may be stationary or may be configured to move. The surface 105 may also be formed by attaching inserts to a metal structure together via the ignition of explosives to cause a transfer of force sufficient to deform the metal structure to engage the inserts for attaching the inserts to the metal structure as may be appreciated from the methods discussed above.

Figure 4:
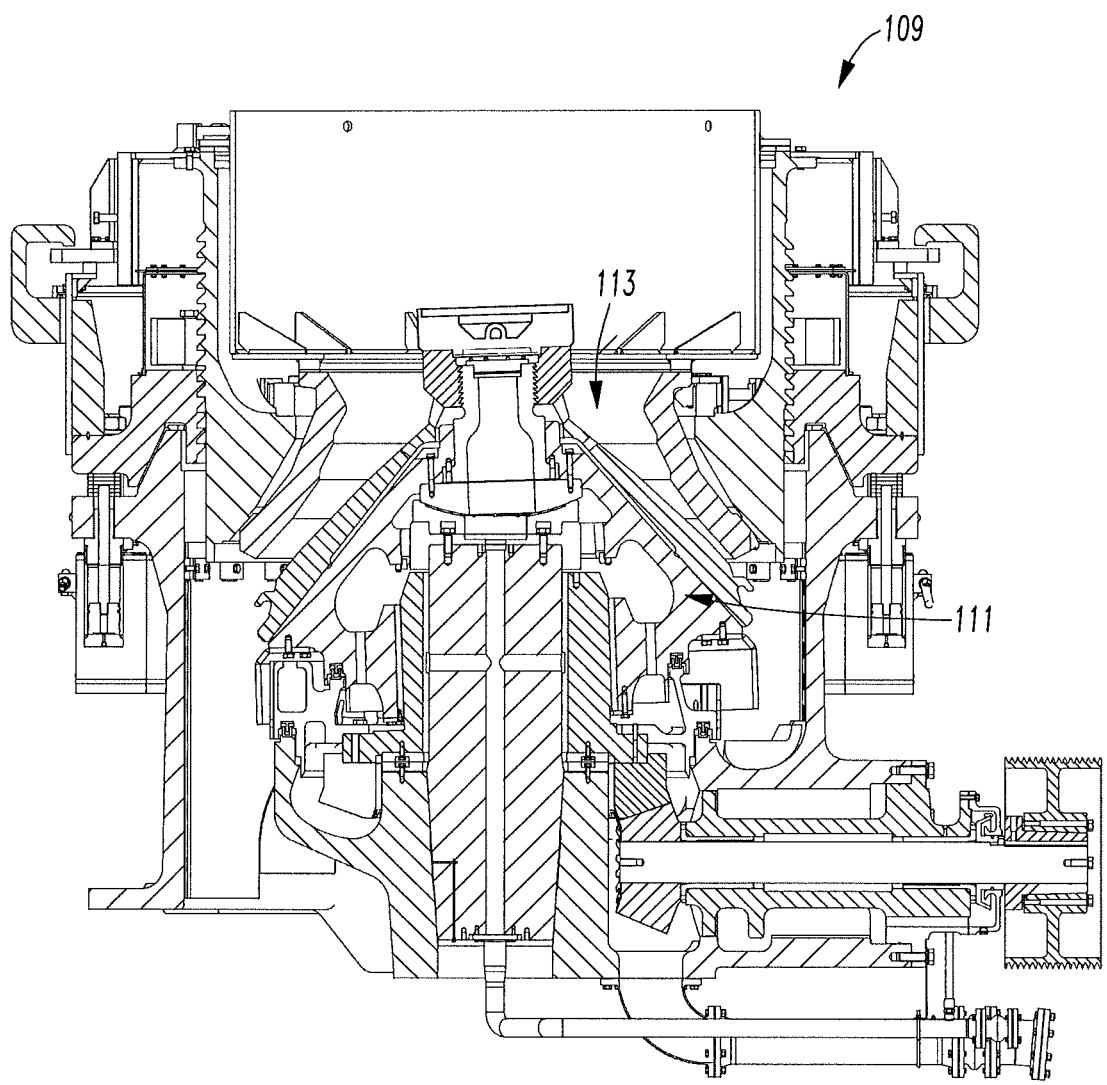
FIG. 4 is a cross sectional view of a second present preferred embodiment of a crushing device.

Referring to FIG. 4, a cone crusher 109 may include a crusher head 111 and a bowl 113. The crusher head may move to crush material between the crusher head and the bowl. The bowl or a liner on the crusher head may include a wearable surface formed as described or referenced above or by a method disclosed in U.S. patent application Ser. No. 12/766,110 (the entirety of which is incorporated herein by reference). For instance, the liner of the crusher head or the bowl may include a wearable surface that is formed by attaching inserts to a metal structure together via the ignition of explosives to cause a transfer of force sufficient to deform the metal structure to engage the inserts for attaching the inserts to the metal structure as may be appreciated from the methods discussed above. It should be appreciated that such a formed structure may be cut or bent or otherwise processed to form the wearable surface of the bowl or liner.

Figure 5:
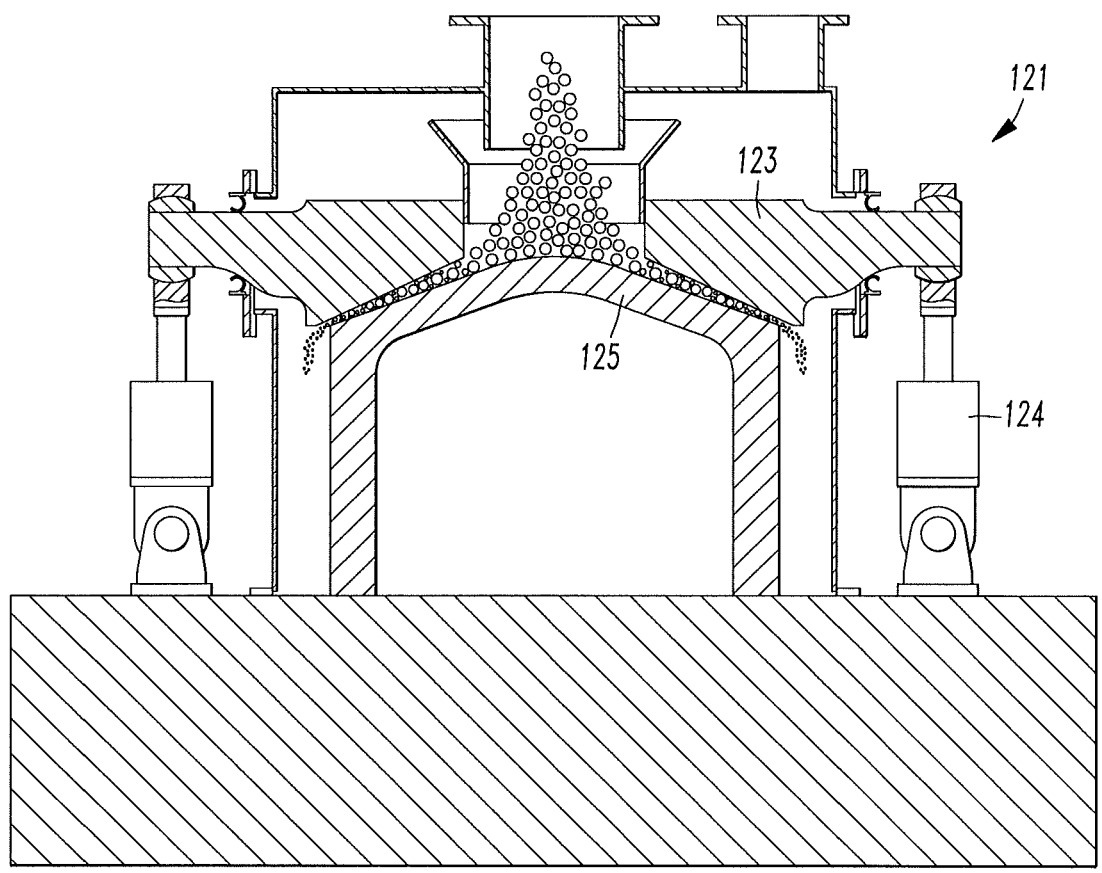
FIG. 5 is a cross sectional view of a third present preferred embodiment of a crushing device.

Referring to FIG. 5, a crushing device 121 may include a die 123 that is attached to actuators 124 that are configured to move the die 123 vertically or linearly to crush material positioned between the die 123 and a table 125, or anvil. In some embodiments of the crushing device 121, the table 125 may be a conveyor belt or a moveable surface. The surface of the table 125 or the crushing surface of the die 123 may include a wearable surface attached thereto as described above. For example, the crushing surface of the die 123 may include a wearable surface formed by attaching inserts to a metal structure via the ignition of explosives to cause a transfer of force sufficient to deform the metal to engage the inserts for attaching the inserts to the metal structure as may be appreciated from the methods discussed above or otherwise discussed herein.

Figure 6:
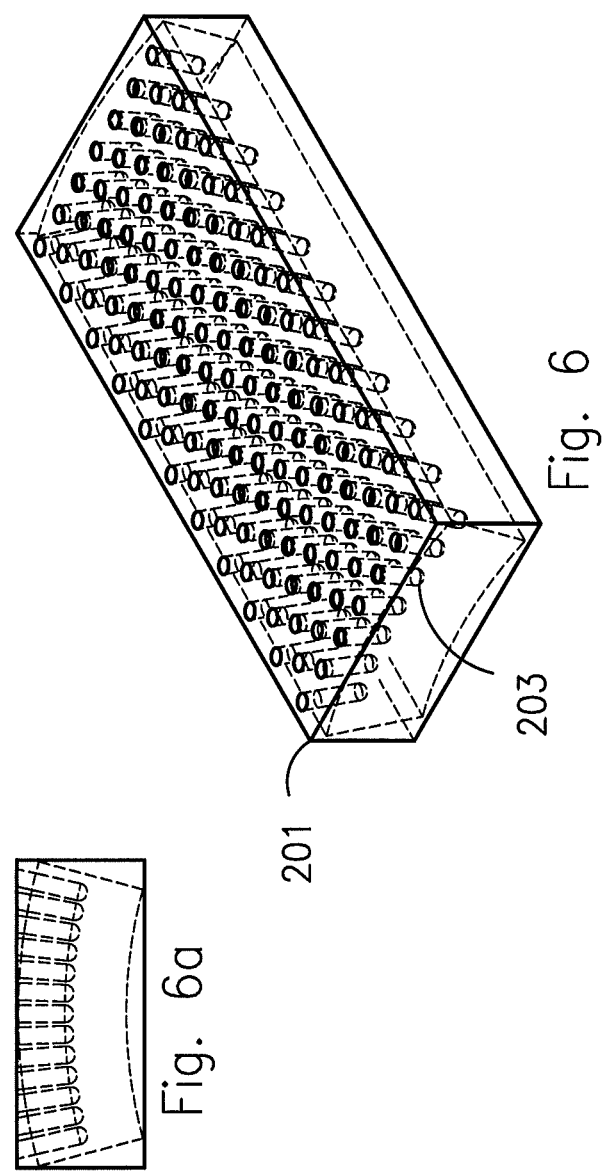
FIG. 6 is a perspective view of a present preferred metal structure having inserts attached therein. The inserts are shown in dotted line and a present preferred segment that may be cut from the metal structure is shown in dotted line.
Figure 7:
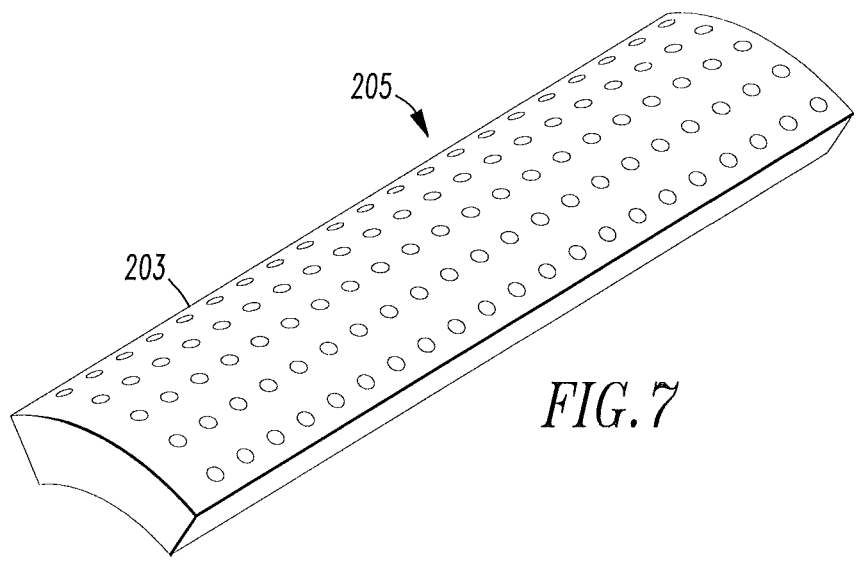
FIG. 7 is a perspective view of a first present preferred segment of a wearable surface.

Embodiments of the method of making wearable surfaces may also be used for retrofitting or repairing wearable surfaces. Referring to FIGS. 6-7, a crushing body 201 may have inserts 203 embedded therein and then may undergo a transfer of force from a driver pipe via ignited explosive material to deform a portion of the crushing body 201 to attach the inserts 203 to the crushing body. The crushing body 201 may then be cut into longitudinal segments 205 that extend along the longest dimension of the crushing body 201.

The metal structure may then be cut into a segment 205 that has a desired shape or size, as may be appreciated from FIG. 7. For example, electric discharge machining, water jet cutting mechanisms or other cutting mechanisms may be used to cut the metal structure to form the segment 205.

The segment 205 may be shaped and sized from the cutting to be a portion of a crushing member 209, such as a roller of a roller mill or a sleeve of a roller mill. The crushing member 209 may have a central channel 207 that is defined by interconnected segments 205. The segments may be interconnected via welding or other interconnection methods. If one of the segments 205 becomes damaged during crushing operations, a new segment 205 may be made and sent to a customer to replace the damaged segment.

Figure 8:
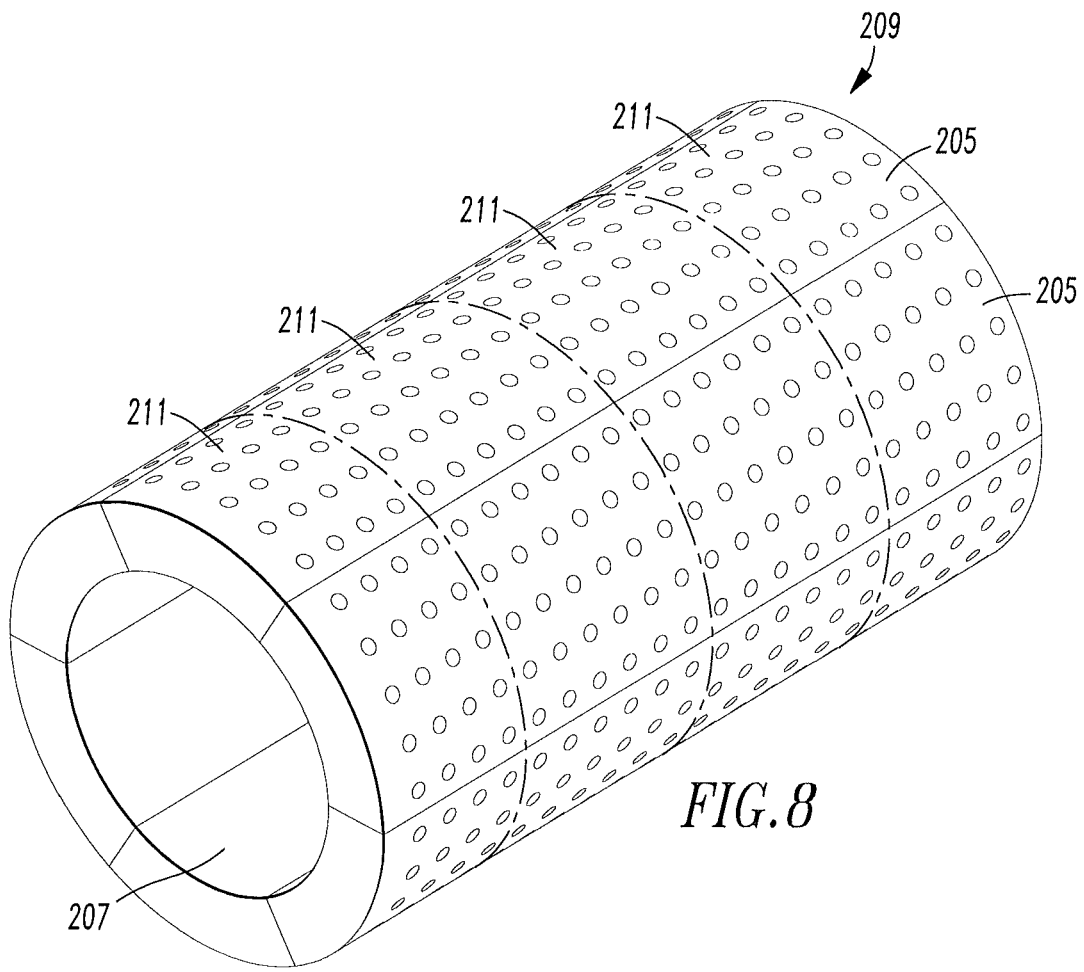
FIG. 8 is a perspective view of a present preferred crushing body that has a wearable surface.

As an alternative, the crushing member may be composed of lateral segments 211, which are shown in chain line in FIG. 8. The lateral segments 211 may be formed and configured for attachment so that the lateral segments 211 extend along the diameter, circumference, or width, of the crushing member 209. Of course, the crushing body may also be cut in different shapes or sizes than those shown as lateral segments 211 or other segments 205.

A cut segment may be attached to other segments to form a crushing member that has a desired shape or configuration or may be used to replace a portion of a crushing member provided to a customer that has become damaged.

It should be understood that each cut segment may undergo further processing, such as machining, finishing, or stress relief treatments prior to being attached to other segments or being used as a crushing body or a component of a crushing member or wearable surface of a crushing member.

Figure 9:
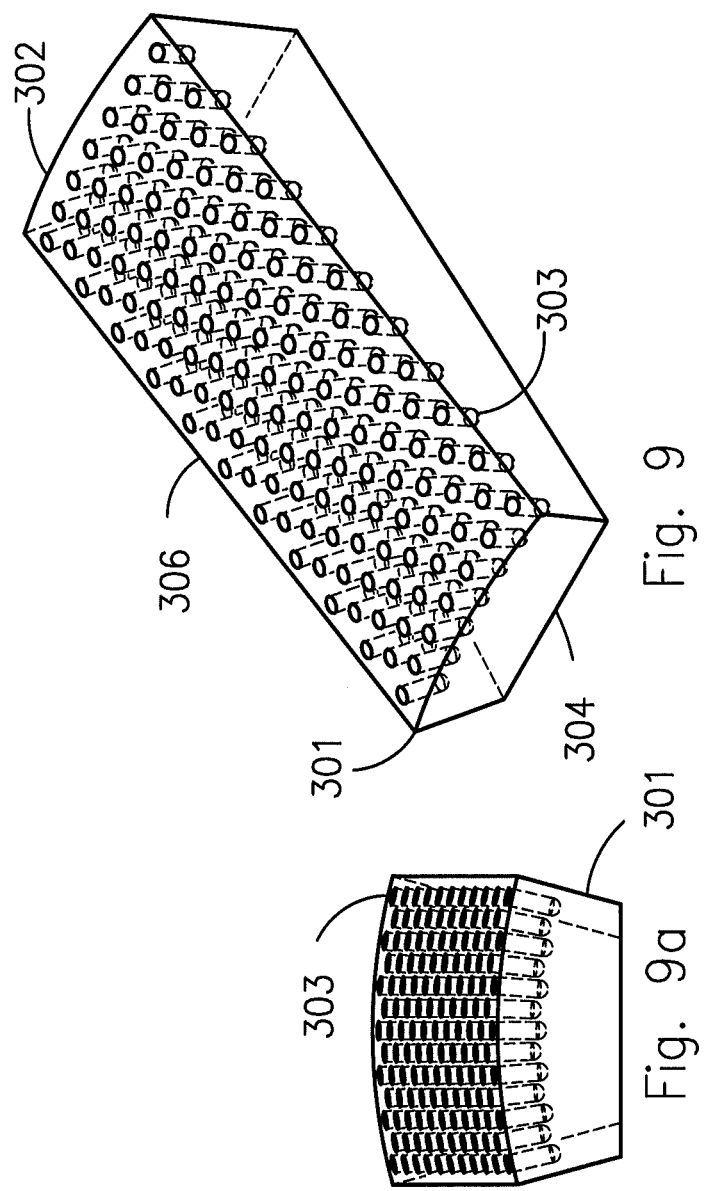
FIG. 9 is a perspective view of a second present preferred segment of a crushing member that includes a wearable surface.

It should also be appreciated that different methods of making crushing members, segments of crushing members or other types of crushing bodies may be utilized. For example, a crushing body may be formed as discussed above with reference to FIG. 1. Referring to FIGS. 9 and 9a, the recesses formed in crushing body 301 may be configured to permit positioning of inserts 303 within the recesses so that inserts 303 are at a progressively deeper position from a first end 302 of the crushing body to a second end 304 of a crushing body. After the inserts are attached to the crushing body via an explosive forging process, the outermost portion of the formed crushing body may be cut, ground or otherwise machined to remove material for shaping the wearable surface of the crushing body 301. The positions of the inserts 303 within the crushing body 301 are located sufficiently deep within the crushing body such that the removal of material from the crushing body does not involve cutting or machining of any inserts and allows the crushing body to be shaped like a wedge as shown in FIG. 9.

The wedge shaped crushing body 301 includes a wearable surface 306 that is generally inclined or declined along a generally linear path. The wearable surface may be configured so that after the wearable surface experiences a significant amount of wear, the harder inserts may be positioned such that an outer portion of the inserts are proud relative to the softer metal portions of the crushing body adjacent to those inserts to define pockets on the wearable surface for retaining material when the wearable surface is used to comminute material.

Figure 10:
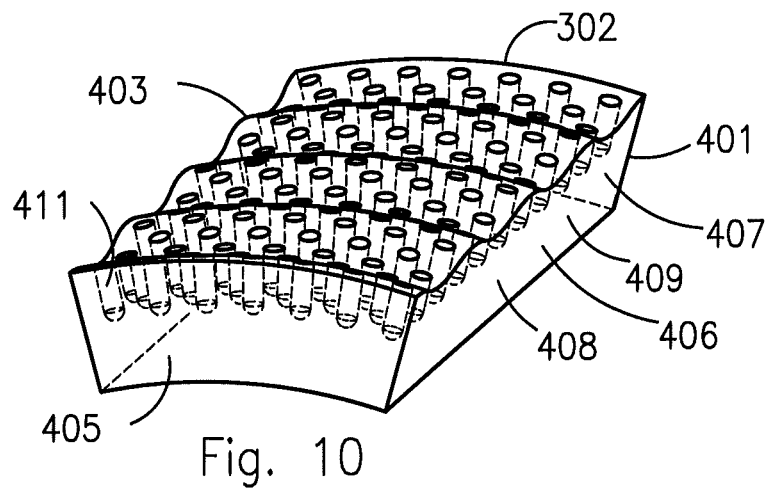
FIG. 10 is a perspective view of a third present preferred segment of a crushing member that includes a wearable surface.
Figure 10A:
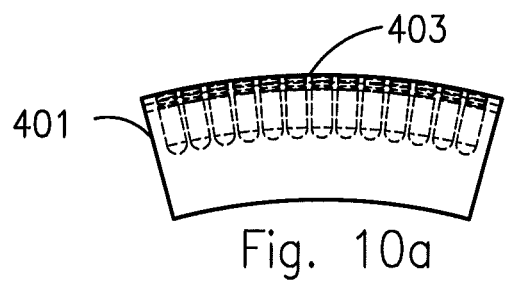
FIG. 10a is a front view of the third present preferred segment of a crushing member that includes a wearable surface.
Figure 10B:
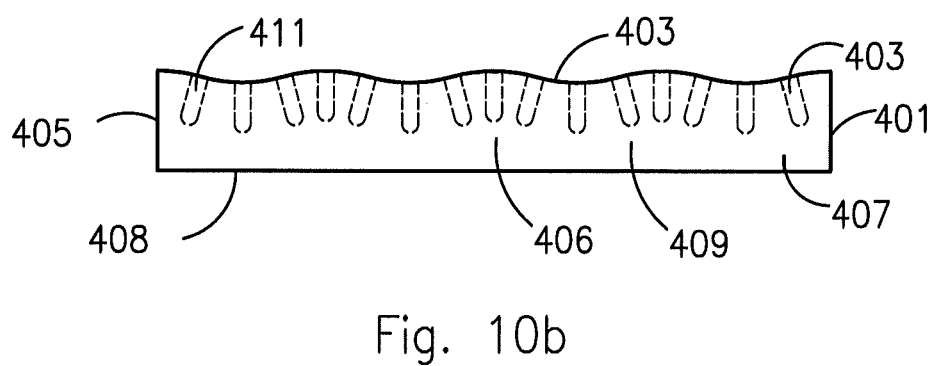
FIG. 10b is a side view of the third present preferred segment of a crushing member that includes a wearable surface. The portions of the inserts positioned in the third present preferred segment are shown in dotted line.

As another example, referring to FIGS. 10-10b, inserts 403 may be positioned within a first metal structure to form a crushing body that is desired to have a waved shape or a contoured surface. The inserts may be attached to the first metal structure 401 to form the crushing body via an explosive forging process as discussed above with reference to FIG. 1 or as may be appreciated from the disclosure provided by U.S. patent application Ser. No. 12/766,110 (the entirety of which is incorporated herein by reference). The inserts may be positioned in the metal structure 401 such that the inserts 411 are at different depths located along the length of the metal structure 401.

For example, inserts 411 may be provided at a first depth in a first portion of the metal structure near a first end 405 of the metal structure 401. Other inserts 411 may be positioned at a second deeper depth at a second portion 406 of the metal structure adjacent to the first end 405. A third set of inserts 411 may be positioned at a different, shallower depth in another portion 407 of the metal structure that is located sufficiently far from the first portion 405 so that the second portion 406 is between the first and third portions 405 and 407. The depth of the inserts 411 positioned in the first and third portions 405 and 407 may be the same depth. Inserts may be placed at fourth and fifth portions 408 and 409 so that the depths of the inserts alternate along the length of the metal structure from lower depths to higher depths back to lower depths etc. from one end of the metal structure to an opposite end of the metal structure so that the inserts are arranged in a wave-like pattern or contoured pattern along the length of the metal structure.

The inserts 411 may also be positioned in the metal structure so that different inserts extend into the metal structure at different directions. For instance, as may be appreciated from FIG. 10b, some inserts 411 may be positioned to extend in a position that is at a 30-45 degree angle relative to the surface of the metal structure 401. Other inserts may be positioned to extend directly into the metal structure so that they extend in a direction that is perpendicular relative to the surface of the metal structure 401. Other inserts may be positioned to extend into the metal structure at other angled positions as well. The inserts 411 may be positioned in channels or recesses that are drilled into the metal structure 401 at different angles for positioning the inserts 411 at these different angled positions. In some embodiments, the different angled positions may be configured such that inserts extend out of the surface of the metal structure such that the extended portions of the inserts are normal to the wearable surface formed on the metal structure.

After the inserts 411 are attached to the metal structure 401, an outer portion of material may be removed from the metal structure to form and shape the wearable surface 403 of the crushing body. The removal of the material may be configured to provide a wave-like wearable surface 403 as may be seen from FIG. 11. Such a removal of material may be performed by grinding that material, machining that material, cutting that material or a combination of such processing of the material to be removed from an outermost portion of the metal structure 401.

Figure 11:
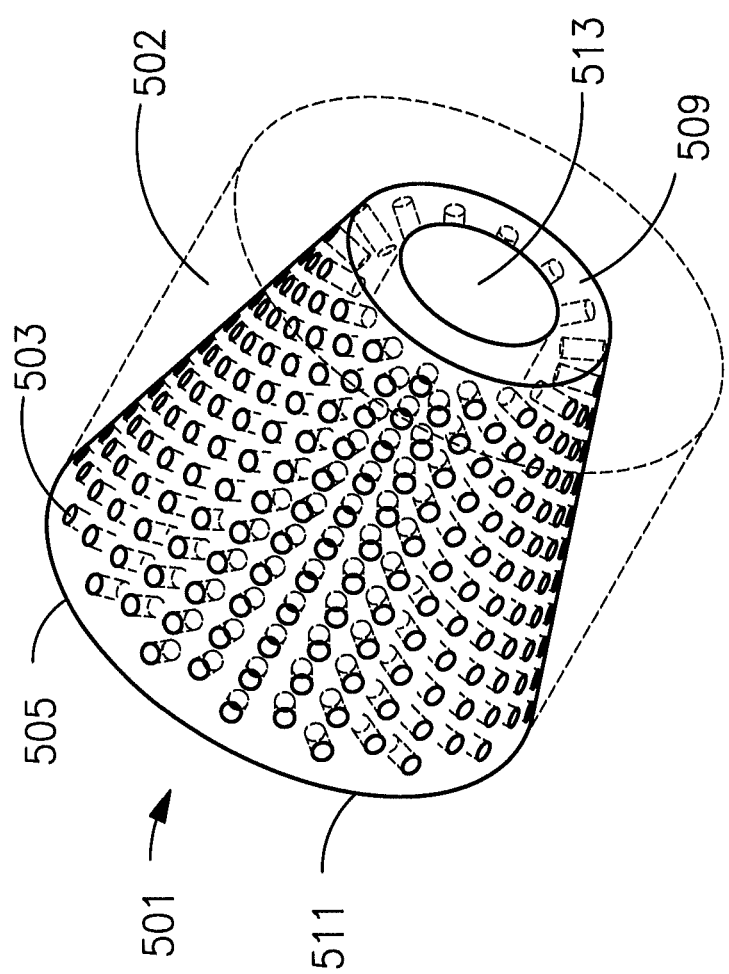
FIG. 11 is a perspective view of a fourth present preferred segment of a crushing member that includes a wearable surface. That wearable surface has a conical-like shape. A portion of material from the metal structure that was removed to form the segment and shape the wearable surface is shown in solid line and portions of inserts within the metal structure are shown in broken line. The outside dotted lines show the original metal structure from which the wear segment is cut.

As yet another example, inserts 503 may be positioned at different depths within different portions of a metal structure to form a crushing body that is conical in shape, such as a frustoconical shaped crushing body 501 shown in FIG. 11. The inserts 503 may be positioned within a metal structure and attached to that metal structure as discussed above with reference to FIG. 1 or as disclosed in U.S. patent application Ser. No. 12/766,110 (the entirety of which is incorporated by reference herein). That metal structure may include a central channel 513 that extends from end 509 to end 511 of the metal structure.

The inserts positioned near end 509 of the metal structure are positioned at a much greater depth into the metal structure than the recesses positioned near the opposite end 511 of the metal structure. The inserts are positioned at progressively shallower depths along the length of the metal structure as the length extends from end 509 to end 511. After the inserts are attached to the metal structure, material 502 may be removed from the metal structure to shape or form the crushing body 501. The removed material 502 is shown in dotted line in FIG. 11. The inserts 503 are positioned such that no portion of any insert is machined or cut when the material 502 is removed.

As yet another example, embodiments of the method discussed above can be utilized to form a crushing body, such as a crushing head of a cone crusher or other crusher device. A metal structure may have inserts attached therein as discussed above with reference to FIG. 1 or as disclosed in U.S. patent application Ser. No. 12/766,110 (the entirety of which is incorporated herein by reference). The inserts may be positioned in that metal structure so that different inserts are located at different depths within the metal structure so that material may be removed from the metal structure to form a crusher head, such as crusher head 601 shown in FIG. 12.

A crusher head may be formed from a plurality of metal segments 601 that have inserts 604 positioned therein. The segments 601 may be formed by cutting or removing material from a metal structure. Material may be removed from the metal structure to form a generally dome-like shaped segment. A plurality of such segments 601 may be attached to form a crusher head. The inserts are positioned within the metal structure 603 so that material may be removed from the metal structure to form segment 601 without machining or cutting any of the inserts 603.

Each segment 601 may be shaped to include a wall 605 that is configured to define an opening after the segments are interconnected to form the crusher head. The opening may be sized and configured to receive a portion of an actuation mechanism for moving the crushing head. In alternative embodiments, the crusher head 601 may be a die or other crushing body or crushing member.

Referring to FIGS. 13 and 13a, a plurality of segments 609 may be cut from one large metal structure 601 that may have inserts attached therein. Preferably, the inserts are attached to the metal structure via explosion forging as discussed above. Multiple pieces 602, 603, 604 may be cut from the metal structure. Those pieces may subsequently be cut to form the segments 609. As an alternative, a cutting mechanism may be utilized to cut the segments 609 from the metal structure 601 without first breaking the metal structure into pieces 602, 603 and 604. For instance, a cutting mechanism may be configured to utilize wear, electric discharge machining or water jet cutting mechanisms to form the segments 609 without having to break the metal structures into pieces prior to such shaping.

As will be understood by those of at least ordinary skill in the art, design parameters may change to meet a particular design objective for a product made from an embodiment of one or more of the methods discussed above. For example, the material properties of the metal of the metal structures and inserts being used may affect the desirable position of an insert within a metal structure or affect other aspects of the explosion forging process used to explosion forge the inserts to the metal structure. As another example, shapes or configurations of a crushing body or crushing member may be altered to meet a particular design objective. For instance, inserts may be positioned at different depths along different portions of a metal structure so that material may be removed from the metal structure to form any number of different geometric shapes or wearable surfaces having a number of different shapes or contours without having to cut, machine or otherwise process any of the inserts attached to the metal structure.

While certain present preferred embodiments of the wearable surfaces, devices that include such wearable surfaces and methods of making and using the same have been shown and described above, it is to be distinctly understood that the invention is not limited thereto but may be otherwise variously embodied and practiced within the scope of the following claims.

What is claimed is:

1. A method of forming a wearable surface of a body sized and configured to comminute material comprising:
   providing a first metal structure, the first metal structure having a first portion, a second portion and a third portion positioned between the first and second portions;
   positioning at least one first insert in the first portion of the first metal structure at a first depth;
   positioning at least one second insert in the second portion of the first metal structure at a second depth;
   positioning at least one third insert in the third portion of the first metal structure at a third depth;
   the third depth being different than at least one of the first depth and the second depth or the first depth being different than at least one of the second depth and the third depth;
   positioning a second metal structure adjacent to the first metal structure such that a gap is formed between the first metal structure and the second metal structure, the second metal structure having a first side facing toward the gap and the first metal structure and the second metal structure having a second side opposite the first side;
   positioning at least one explosive material adjacent to the second side of the second metal structure;
   igniting the at least one explosive material to attach the at least one first insert, the at least one second insert and the at least one third insert to the first metal structure; and
   removing material from at least one of the first portion of the first metal structure, the second portion of the first metal structure, the third portion of the first metal structure, and the second metal structure to shape a wearable surface of a crushing body.

2. The method of claim 1 wherein the first depth is equal to the second depth or wherein the first depth is less than the second depth or wherein the first depth is greater than the second depth or wherein the third depth is equal to the second depth or wherein the third depth is less than the second depth or wherein the third depth is greater than the second depth.

3. The method of claim 1 wherein the at least one explosive material is positioned adjacent to the second side of the second metal structure by being placed on the second side of the second metal structure or by being attached to the second side of the second metal structure.

4. The method of claim 1 wherein the removing of material from at least one of the first portion of the first metal structure, the second portion of the first metal structure, the third portion of the first metal structure, and the second metal structure to shape the first metal structure and shape the wearable surface of the crushing body is performed to form the wearable surface such that the wearable surface has a circular shape, a toroidal shape, a curved shape, a contoured shape, a conical shape, a frustoconical shape, a domed shape, a wedged shape, a waved shape, a convex shape or a concave shape.

5. The method of claim 4 wherein the crushing body is sized and configured to be a liner, a sleeve, or a segment of a crushing member.

6. The method of claim 5 wherein the crushing body is a segment of a crushing member and the crushing member is a roller of a mill or the crushing member is a die of a crushing device; or
   wherein the crushing body is a segment of a crushing member and the crushing member is a table, an anvil or a wall of a crushing device.

7. The method of claim 6 further comprises attaching the segment to at least one other segment of a crushing member to form the crushing member.

8. The method of claim 1 wherein the removing material from at least one of the first portion of the first metal structure, the second portion of the first metal structure, the third portion of the first metal structure, and the second metal structure to shape the first metal structure and form a wearable surface of a crushing body is at least partially performed by at least one of machining, grinding, saw cutting, wear, electric discharge machining, and water jet cutting mechanisms.

9. The method of claim 1 wherein the at least one first insert, the at least one second insert and the at least one third insert are positioned such that none of the at least one first insert, at least one second insert and at least one third insert are cut, machined, or grinded when the material is removed from at least one of the first portion of the first metal structure, the second portion of the first metal structure, the third portion of the first metal structure, and the second metal structure to shape the first metal structure and form a wearable surface of a crushing body.

10. The method of claim 1 further comprising the second metal structure directly impacting the first metal structure such that the second metal structure has an intramolecular bond or a metallurgical bond with the first metal structure.

11. The method of claim 10 wherein the at least one first insert, the at least one second insert and the at least one third insert do not have a metallurgical bond with the first metal structure after the at least one first insert, the at least one second insert and the at least one third insert are attached to the first metal structure.

12. The method of claim 10 wherein spacers are positioned between the first and second metal structures to position the second metal structure adjacent to the first metal structure to form the gap.

13. The method of claim 1 wherein the at least one first insert is harder than the first metal structure, the at least one second insert is harder than the first metal structure and the at least one third insert is harder than the first metal structure; and wherein the at least one explosive material is ignited to cause deformation of the first portion, second portion and third portion of the first metal structure to attach the at least one first insert, at least one second insert and at least one third insert to the first metal structure.

14. The method of claim 13 wherein the at least one first insert is less hard than the at least one third insert and the at least one second insert is less hard than the at least one third insert or wherein at least one of the at least one third insert and the at least one first insert is comprised of a material that is less hard than the first metal structure.

15. The method of claim 1 wherein the at least one first insert is positioned within at least one first recess that extends to the first depth;
   the at least one second insert is positioned within at least one second recess that extends to the second depth; and
   the at least one third insert is positioned within at least one third recess that extends to the third depth; and
   wherein the first depth of the at least one first recess generally extends within the first metal structure in a direction that is different than at least one of the second depth and third depth.

16. The method of claim 1 further comprising moving the second metal structure away from the first metal structure and providing stress relief to the crushing body.

17. The method of claim 1 wherein the positioning of the at least one first insert is comprised of drilling at least one first recess into the first portion of the first metal structure and positioning a respective first insert of the at least one first insert into a respective first recess of the at least one first recess; and wherein the positioning of the at least one second insert is comprised of drilling at least one second recess into the second portion of the first metal structure and positioning a respective second insert of the at least one second insert into a respective second recess of the at least one second recess; and wherein the positioning of the at least one third insert is comprised of drilling at least one third recess into the third portion of the first metal structure and positioning a respective third insert of the at least one third insert into a respective third recess of the at least one third recess.

18. The method of claim 1 wherein the at least one first insert, the at least one second insert and the at least one third insert are comprised of at least one of conical insert members, tapered insert members, spherical insert members, and cylindrical insert members; and wherein the material is agglomerated material, rock, stone, minerals, or ore; and wherein the inserts are covered by a portion of the first metal structure after the at least one explosive material is ignited.

19. The method of claim 1 wherein the first depth is equal to the second depth or wherein the first depth is less than the second depth or wherein the first depth is greater than the second depth or wherein the third depth is equal to the second depth or wherein the third depth is less than the second depth or wherein the third depth is greater than the second depth.

* * * * *